United States Patent [19]

Hart

[11] 3,768,309

[45] Oct. 30, 1973

[54] PLASTIC-ENCAPSULATED VARIABLE-AREA FLOWMETER

[75] Inventor: John Michael Hart, High Lorton, England

[73] Assignee: Fischer & Porter Company, Warminster, Pa.

[22] Filed: Apr. 28, 1972

[21] Appl. No.: 248,413

[52] U.S. Cl. .................................................. 73/209
[51] Int. Cl. .............................................. G01f 1/00
[58] Field of Search ..................... 73/207, 208, 209

[56] References Cited
UNITED STATES PATENTS

| | | | |
|---|---|---|---|
| 3,416,370 | 12/1968 | Kaucher et al. | 73/209 |
| 2,643,546 | 6/1953 | Boehm | 73/209 |

*Primary Examiner*—S. Clement Swisher
*Assistant Examiner*—Arthur E. Korkosz
*Attorney*—Michael Ebert

[57] ABSTRACT

A flowmeter of the rotometer type, wherein a variable-area tube formed of glass and containing a float, is supported between inlet and outlet end fittings having ports to receive inlet and outlet pipes. The tube and the end fittings, save for the ports, are encapsulated in a transparent plastic jacket adapted to pre-stress the tube to enhance the pressure characteristics of the meter. The cross-sectional shape of the jacket is such as to provide a magnifying lens with respect to a calibrated scale extending along the tube, the jacket also serving as a protective shield in the event the tube is shattered.

9 Claims, 5 Drawing Figures

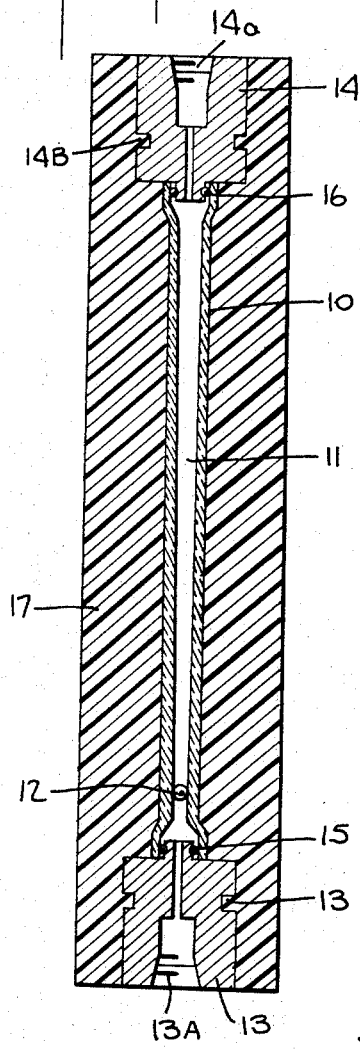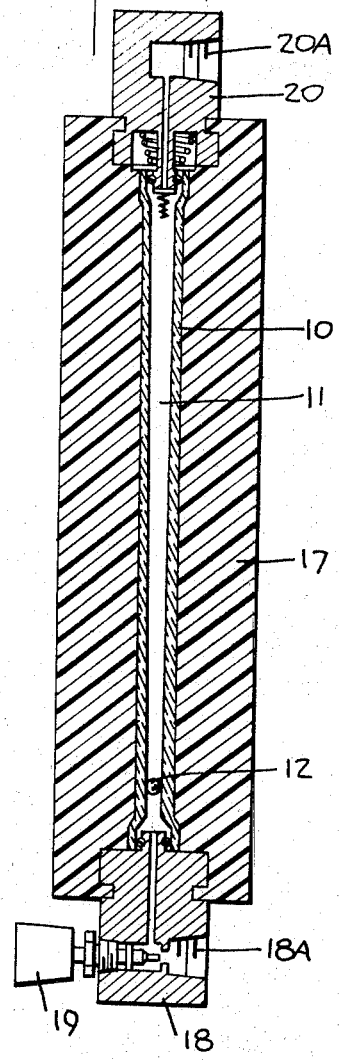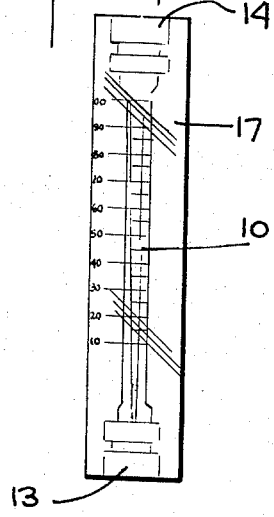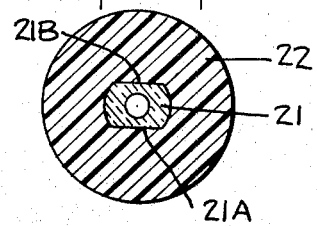

PLASTIC-ENCAPSULATED VARIABLE-AREA FLOWMETER

BACKGROUND OF THE INVENTION

This invention relates generally to a flowmeter of the rotometer type having a variable-area tube, and more particularly to a rotometer in which the meter tube is coupled to end fittings and is encapsulated in a plastic jacket to enhance the pressure characteristics of the meter, as well as to improve the readability of the meter scale.

In the usual type of rotometer, a weighted plummet or float contained in an upright tapered tube is raised to a position of equilibrium between the downward force of the float and the upward force of the fluid flowing past the float through the annular orifice surrounding the float. The term "rotometer" was derived from the fact that plummets originally had slots therein to impart a rotational force for the purpose of centering and stabilizing the float. The present trend, however, is toward guided, non-rotating floats.

In one well-known commercial form of rotometer, such as that disclosed in the prior U.S. Pat. No. 3,342,068, in lieu of a tapered tube, the flowmeter is provided with a tube having a tapered bore affording a variable cross-sectional area. The float disposed in the bore assumes a vertical position depending on the rate of fluid flow, which may be liquid or gas. The vertical position of the float is indicated along a calibrated scale on the front of the tube.

Because the meter tube is made of glass and is relatively fragile, in existing variable-area tube flowmeters the tube is supported by end fittings mounted within a case adapted to protect the tube against stresses as well as to effect tight sealing thereof. In the typical arrangement, the end fittings for the tube are attached to the case at opposing positions therein, and inlet and outlet adapters are provided to facilitate insertion of the tube in the end fittings.

As operating pressure is increased in the flowmeter tube, the ends of the glass tube are subjected to a substantial pressure from the end fittings. Since the end fittings are confined within the case, the pressure on the end fittings is applied to the case. Because of the pressure developed at the ends of the tubes, there is a tendency for the case to warp, and as the case distorts it transmits a bending moment to the tube.

On a long, slender tube, the resultant cross-bending gives rise to a readily visible bow. In a shorter tube, the amount of bowing is less evident to the naked eye, but it is reflected in lowered strength values for the tube.

It has been found that the bowing phenomenon experienced in conventional flowmeter tube arrangements will in some instances result in breakage of the tube. Thus the very meter case intended to protect the tube is responsible for damage thereto. Moreover, existing case or frame arrangements for variable-area flowmeters add materially to the cost of the meter.

The pressure rating of a variable-area metering tube depends on the tensile strength characteritsics of the glass used to form the tube, as well as on its wall thickness. However, the maximum pressure rating of a given meter affords no assurance that breakage will not occur at lower pressures. Thus, in one commercially available variable-area tube flowmeter, the following "Warning" appears in the Instruction Bulletin supplied with the meter.

"Glass metering tubes have been designed to operate up to the maximum-design working pressures listed herein. This is not to be construed as a certification that the tubes will not break at any pressure. Inherent material limitations can result in tube breakage due to conditions beyond our control. Because breakage and high operating pressures (particularly when metering gases or liquids above their normal boiling points) represent a greater hazard to personnel, operator protection is recommended for pressures above 50 PSIG."

An exposed glass tube of good inherent strength may be weakened by scratches on the surface thereof, and should the tube shatter in the course of the operation, serious injuries may be inflicted on personnel in the vicinity thereof. Also, the manner of installation may be defective, and give rise to stresses resulting in tube fracture. While it has sometimes been the practice to provide safety enclosures for the variable-area glass tube meters, this adds materially to the cost of installation and also interferes to some extent with the readability of the meter.

Another factor which comes into play in the commercial acceptability of a flowmeter is its appearance. The tendency in modern industrial design is to avoid instrument structures that are cumbersome. The fact that a standard variable area meter mounted in a frame operates effectively is not the sole factor involved in the saleability of the meter, for the ungainly appearance of this meter militates against its acceptance in a system in which the other instruments have a smart, streamlined appearance.

SUMMARY OF THE INVENTION

In view of the foregoing, it is the main object of this invention to provide a flowmeter having a variable-area tube supported by end fittings having ports therein to receive inlet and outlet pipes, the tube and the end fittings, save for the ports, being protectively encapsulated in a transparent plastic jacket.

More specifically, it is an object of this invention to provide a flowmeter of the above-described type, in which the protective plastic jacket functions to pre-stress the meter tube to enhance the pressure characteristics of the meter, as well as to shield personnel in the event the tube is shattered.

Also an object of the invention is to provide an encapsulated flowmeter in which the protective jacket resists the application of bending forces to the tube and thereby serves to prevent damage to the meter.

Still another object of the invention is to provide a protective jacket formed of acrylic or other transparent material having good optical properties, the jacket being shaped to define a magnifying lens for enlarging the meter scale to improve the readability thereof.

A significant feature of the invention is that the encapsulated flowmeter has an unencumbered smart appearance consonant with modern industrial design requirements.

Briefly stated, these objects are attained in a meter constituted by a variable-area transparent flow tube, containing a float and supported by inlet and outlet end fittings having axial or transverse ports for connection to inlet and outlet pipes. The tube and the end fittings, save for the ports, are encapsulated in a clear plastic jacket adapted to pre-stress the tube to enhance the pressure characteristics of the meter, the cross-sectional form of the jacket being such as to create a

OUTLINE OF THE DRAWING

For a better understanding of the invention, as well as other objects and further features thereof, reference is made to the following detailed description to be read in conjunction with the accompanying drawing, wherein:

FIG. 1 is a longitudinal section taken through a first preferred embodiment of a variable-area tube flowmeter in accordance with the invention;

FIG. 2 is an end view of the flowmeter;

FIG. 3 is an elevational view of the flowmeter;

FIG. 4 is a longitudinal section taken through a second preferred embodiment of a variable-area flowmeter in accordance with the invention; and FIG. 5 is a transverse section taken through a third preferred embodiment of the meter.

DESCRIPTION OF THE INVENTION

Referring now to the drawing, there is shown a flowmeter in accordance with the invention, which includes an open-ended, transparent meter tube 10, preferably fabricated of borosilicate glass and having a precision-molded, tapered bore 11 extending longitudinally therein to provide a variable area passage to accommodate a float 12. The tube extends between an inlet end fitting 13 and an outlet end fitting 14.

Float 12 preferably consists of a spherical ball of stainless steel or other non-corrodible material. The float, under fluid pressure, is raised in tube 10 from an inlet stop which may be formed by an identation in the glass tube just below the lowest scale reading, and an outlet stop which in practice may be a coil spring threaded into outlet fitting 14. Indicia are etched or otherwise formed along tube 10 to define a calibrated meter scale.

Inlet and outlet fittings 13 and 14 are of identical construction, each having an internally threaded port 13A and 14A to which pipes in axial alignment with the meter may be coupled to supply fluid for passage through the meter. A seal between the ends of the tube and the end fittings is effected by O-rings 15 and 16.

The end fittings are preferably of a non-corrosive material of high strength, and for this purpose, one may use stainless steel, polyvinyl chloride, nylon, Penton or Kynar. The invention is applicable to all standard types of flowmeters having variable-area tubes coupled to end fittings, the meter shown in the Figures being merely by way of example.

The entire meter assembly, that is, the variable-area tube 10 and end fittings 13 and 14, save for the faces of the fittings which contain the inlet and outlet ports, is encapsulated in a transparent plastic matrix or jacket 17 which is cylindrical in form, whereby tube 10 and fittings 13 and 14 are protectively embedded therein. In order to securely maintain the end fittings within the plastic matrix, the fittings are provided with annular grooves 13B and 14B which are filled with the plastic material to lock the fittings to the jacket.

As is well known, acrylic materials such as Lucite and Plexiglas, transmit and diffuse light efficiently. Jacket 17 may be made of any clear plastic of good strength, but is preferably fabricated of acrylic material, which is advantageous not only because it exhibits crystal clarity, but also because of its high impact strength, formability, and high resistance to sunlight and most chemicals.

The jacket may be fabricated by an acrylic casting technique in which the raw material (monomeric methyl methacrylate) is a liquid monomer. This monomer, under proper treatment, has the property of reacting with itself chemically to set into a solid polymer. If, during the chemical action, the monomer is confined within a mold of the desired form, the resulting polymer will assume the shape of the mold. In practice a dye may be added to the monomer to impart color to the jacket without impairing its transparency.

To form an encapsulated flowmeter, the meter assembly is supported within a mold having the desired cylindrical form, and the acrylic monomer is fed into the mold. The acrylic jacket, when setting, shrinks somewhat, thereby pre-stressing the variable-area tube. Thus the jacket not only functions to resist bending forces that might fracture the tube and to protect the tube surface from scratches, but it also serves to enhance the pressure characteristics of the meter.

As a consequence, a flowmeter whose maximum working pressure is, say, 30 PSIG, will, when encapsulated, have a much higher maximum working pressure, but even if the meter were to break in the course of operation, the jacket will confine the shattered glass and prevent injury to personnel. pre-stressing may also be effected by an injection molding procedure to encapsulate the meter assembly.

Because of the optical properties of the acrylic jacket and the fact that the semi-cylindrical section of the jacket in front of the tube scale acts as a magnifying lens, and readability of the scale is improved to a marked degree. Moreover, the lens also acts to magnify the float so that its position in the tube is rendered more visible.

The variable-area flowmeter shown in FIG. 4 is also encapsulated, and it differs from that shown in FIG. 1 mainly by reason of the end fittings which are adapted for transverse connection rather than axial connection to inlet and outlet pipes. Thus inlet and end fitting 18 has a transverse port 18A, and a control valve 19 cooperating therewith to vary input flow. Outlet end fitting 20 has a transverse port 20A. It will be seen, in this instance, that plastic jacket 17 only embraces that portion of the fittings which adjoins the ends of the tube in order to fully expose the transverse ports.

In FIGS. 1 and 4, the meters are provided with flow tubes having a cylindrical form. It is also possible to encapsulate tubes having a flattened longitudinal face or faces, as shown in FIG. 5, wherein the variable-area tube 21 is embedded in a cylindrical jacket 22, tube 21 having flattened faces 21A and 21B on opposing sides thereof. A scale is inscribed along the front face, whereas the rear flattened face may be silvered to improve the readability of the scale on the front face. Here again, the jacket functions to prestress the tube as well as a magnifying lens therefor.

While there have been shown and described preferred embodiments of encapsulated variable-area flowmeters in accordance with the invention, it will be appreciated that many changes and modifications may be made therein without, however, departing from the essential spirit of the invention.

I claim:

1. A rotometer comprising:

A. a tube formed of transparent material and having a tapered longitudinal bore therein affording a vertical fluid passage having a variable cross-sectional area, B. a float disposed in said bore, said float assuming a vertical position therein depending on the rate of fluid flow in said fluid passage, C. inlet and outlet end fittings mounted on opposing ends of said tube, each fitting having a port connectable to a fluid line, and D. a jacket formed of transparent plastic material in direct contact with the entire outer surface of said tube and encapsulating said tube and the portions of said fittings adjoining the ends of the tube to lock said fittings to the jacket and to resist the application of bending forces to said tube, the ports being exposed.

2. A rotometer as set forth in claim 1, wherein said jacket is shrunk to pre-stress tube to enhance its pressure characteristics.

3. A rotometer as set forth in claim 1, wherein said jacket is made of acrylic material.

4. A rotometer as set forth in claim 1, wherein said ports are transverse with respect to the longitudinal axis of the tube.

5. A rotometer as set forth in claim 1, wherein said ports are in axial alignment with the longitudinal axis of said tube.

6. A rotometer as set forth in claim 1, wherein said tube is provided with a longitudinal scale and said jacket has a cross-sectional formation creating a magnifying lens with respect to said scale.

7. A rotometer as set forth in claim 6, wherein said formation is cylindrical.

8. A rotometer as set forth in claim 1, wherein said tube is formed of borosilicate glass.

9. A rotometer as set forth in claim 1, wherein said end fitting is formed of a non-reactive metal having a cylindrical shape and provided with annular grooves filled with the material of said jacket to lock said fittings to said jacket.

* * * * *